United States Patent [19]

Crumb et al.

[11] Patent Number: 5,046,313
[45] Date of Patent: Sep. 10, 1991

[54] MASTER CYLINDER WITH FLUID LEVEL AND PRESSURE FAILURE DETECTION

[75] Inventors: Donald A. Crumb, Granger; William F. Dillon, Jr., South Bend, both of Ind.; Robert F. Gaiser, Stevensville; Richard A. Zander, Niles, both of Mich.

[73] Assignee: Allied-Signal Inc., Morristown, N.J.

[21] Appl. No.: 385,529

[22] Filed: Jul. 27, 1989

[51] Int. Cl.[5] .................. F15B 7/00; H01H 35/38; B60Q 11/00
[52] U.S. Cl. .................. 60/535; 60/534; 60/545; 200/82 D; 340/450.1; 340/452; 340/459
[58] Field of Search .......... 200/82 D, 82 E; 340/452, 450.1, 459; 60/534, 535, 545, 561, 562

[56] References Cited

U.S. PATENT DOCUMENTS

| | | | |
|---|---|---|---|
| 3,464,741 | 9/1969 | Falk | 200/82 D X |
| 3,560,918 | 2/1971 | Lewis et al. | 200/82 D X |
| 3,576,959 | 4/1971 | Bogosoff | 340/450.1 X |
| 3,593,267 | 7/1971 | Klein | 200/82 D X |
| 3,632,924 | 1/1972 | Harper | 200/82 D |
| 3,736,393 | 5/1973 | Apple et al. | 200/82 D |
| 3,872,885 | 3/1975 | Eloi et al. | 200/82 D X |
| 3,910,640 | 10/1975 | Kozakai et al. | 200/82 D X |
| 3,945,686 | 3/1976 | Orzel | 200/82 D X |
| 3,947,648 | 3/1976 | Muterel | 200/82 D |
| 3,967,238 | 6/1976 | Ridpath et al. | 340/450.1 |
| 3,980,987 | 9/1976 | Ishigami et al. | 200/82 D X |
| 4,068,900 | 1/1978 | Doerfler et al. | 200/82 D X |
| 4,082,930 | 4/1978 | Peeples | 340/450.1 X |
| 4,097,841 | 6/1978 | Otsuka et al. | 200/82 D X |
| 4,217,779 | 8/1980 | Masuda et al. | 340/450.1 X |
| 4,272,659 | 6/1981 | Orzel | 200/82 D |
| 4,604,866 | 8/1986 | Gaiser | 60/535 |
| 4,736,990 | 4/1988 | Brown et al. | 200/82 D X |

Primary Examiner—Edward K. Look
Assistant Examiner—John Ryznic
Attorney, Agent, or Firm—Leo H. McCormick, Jr.; Ken C. Decker

[57] ABSTRACT

A master cylinder (12) having a switch (70) which is activated by either a magnet (78) carried by a float (76) in a reservoir (40) or a pin (66) moved by a differential area piston (52). The switch (70) had a first blade (82) connected a source of electrical current (106) through an indicator light (124) and a second blade (88) connected to an electrical ground (114). A reed switch (100) is connected to the first (82) and second (88) blades and responds to the magnet to close an electrical circuit to operate the indicator light (124) if a low fluid level is present in the reservoir (40). A first contact (96) on the first blade (82) is positioned in switch 70 by a non-electrical conductive actuation pin (66) that extends through the housing (22) of the master cylinder (12). A second contact (94) on the second blade (88) has a projection (92) that engages the housing (22) of the master cylinder (12) to define a fixed location for the first contact (94) and establish a fixed gap between the first (94) and second (96) contacts. If a pressure differential is created in the master cylinder (12) between the fluid pressure supplied to operate the wheel brakes (18) and (20), the differential area piston (52) moves and brings the second contact (96) into engagement with the first contact (94) to close the electrical circuit and activate the indicator light (124).

6 Claims, 2 Drawing Sheets

MASTER CYLINDER WITH FLUID LEVEL AND PRESSURE FAILURE DETECTION

The present invention relates to a switch for an electrical circuit through which a failure signal in a master cylinder is communicated to an indicator. The switch has a first blade connected to the indicator and a second blade connected to a source of electrical current. A reed assembly connected to the first and second blades is activated by a magnet when the fluid level in a reservoir is below a set level and an actuation pin moved by a differential area piston brings contacts on the blades into engagement should a fluid pressure differential occur in the master cylinder.

Heretofore, when a master cylinder included both a combined fluid level and a pressure failure indicator a modification of a master cylinder housing was required to accommodate a failure indicator switch. In addition, the terminal of the switch was located in an axial plane that extended from the housing of the master cylinder and was subject to damage during assembly of other vehicle components and/or normal handling. Further, when the master cylinder housing was used as the ground for the electric circuit for the indicators errant warning signals may occur under some conditions when the housings are anodized a good electrical ground may not always achieved and as a result false signals or no signal may be communicated to a dash board indicator light. Previous attempts at integrating a fluid level and a pressure failure indicator in a master cylinder have not been widely accepted by most vehicle manufacturers. Examples of prior art master cylinders are illustrated in U.S. Pat. No. 4,084,377 and U.S. Pat. No. 3,560,918.

U.S. Pat. No. 4,604,866 and U.S. patent application Ser. No. 385,502 discloses master cylinders which integrated a fluid level warning device and pressure failure indicator into a single indicator circuit. In these devices magnets activate a reed switch and inform an operator of a failure in the brake system. While these systems operate in an acceptable manner, the cost of the magnets and close tolerance required in the manufacture of these master cylinders have not achieved customer acceptance.

In an effort to reduce manufacturing cost and yet improve the operational characteristics of the failure warning circuit in a master cylinder, the present invention discloses a combined switch for a fluid level and pressure failure indicator that is compact and can be installed in a protected position under a reservoir of a master cylinder.

In the present invention, the switch is installed in a master cylinder comprising a housing having a first bore for retaining a pair of pistons which are moved to develop fluid pressure in a pair of pressure chambers to effect a brake application. A second bore in the housing perpendicular to the first bore receives a differential area piston and first and second passages connect the pair of pressure chambers with the second bore. The differential area piston remains stationary during a brake application with substantially equal pressures generated in the pressure chambers. Should a pressure differential occur, the differential area piston moves in response to a failure mode in either pressure chamber and closes a signal circuit and provides an indicator with a failure mode signal. A reservoir attached to the master cylinder housing contains fluid which is in communication with the pair of pressure chambers when the pistons are in a rest position. A float located in the reservoir, has a magnet for actuating the switch in the signal circuit when the fluid level in the reservoir is below a predetermined level. The switch is characterized by a first blade connected through a reed switch to a second blade. The reed switch responds to the magnet on the float to close the signal circuit and inform an operator of a predetermined fluid level in said reservoir. The first blade has a first contact with a projection that engages master cylinder housing to define a set distance between the first contact and the housing. The second blade has a second contact which engages a non electrical conductive actuation pin that extends though the housing. The actuation pin is located in a groove in the differential area piston. The length of the actuation pin establishes a preset gap between said first and second contacts. On movement of the differential area piston as a result of the development of the failure mode in a pressure chamber, actuation pin moves out of the groove and up a ramp to a land to bring the second contact into engagement with the first contact and close the signal circuit to allow an indicator light to inform an operator of the failure mode in one of the pressure chambers.

It is an advantage of the present invention that a switch strategically located between a reservoir and a master cylinder housing picks up a magnetic signal from a magnet carried by a float and a mechanical signal from a differential piston to close an electrical circuit and activate an indicator light to inform an operator of a failure mode in a brake system. Furthermore, since the reservoir assembly accommodates the switch and the float, the electrical circuit can be tested separate from the master cylinder housing.

Figure 1:
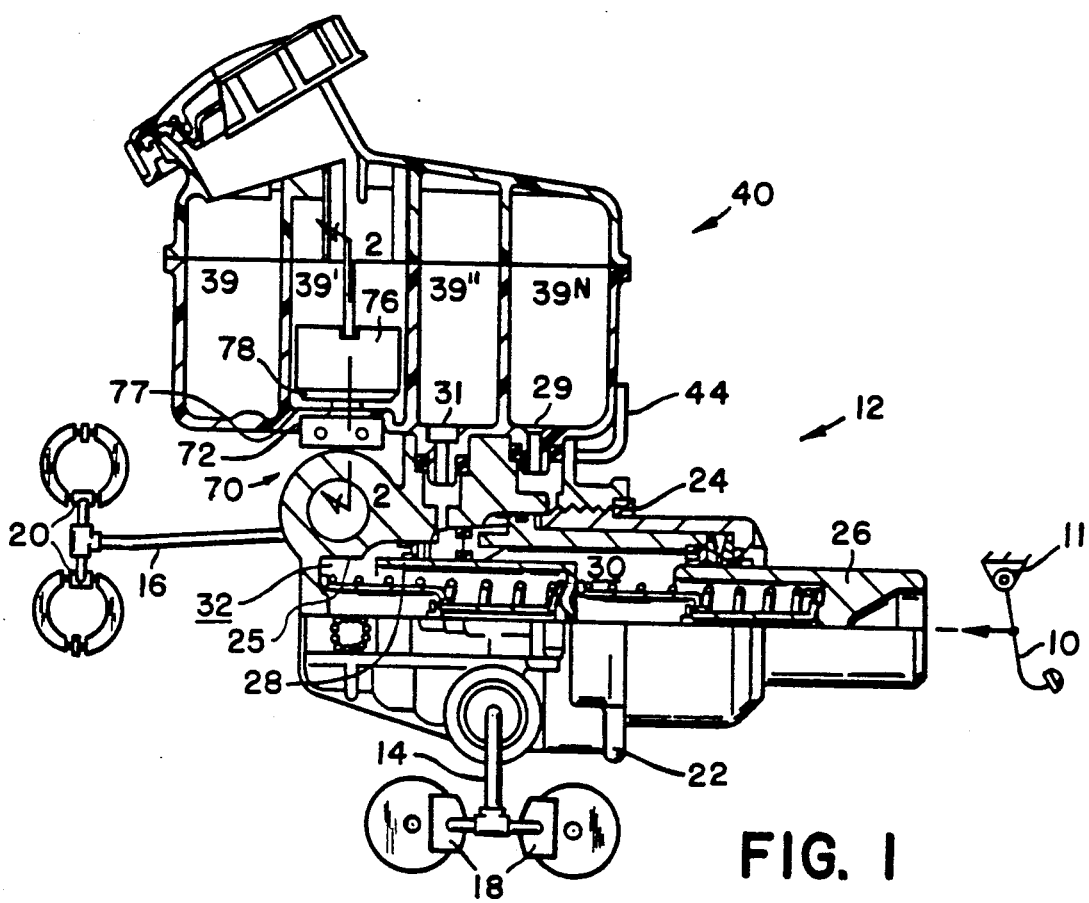
FIG. 1 is a sectional view of a master cylinder in a brake system having a switch for a failure indicator system made according to the teachings of this invention.

A brake system includes a brake pedal 10 which is operated by a driver of a vehicle to control braking for the vehicle. The pedal 10 is connected to a master cylinder 12 to generate fluid pressure therein during braking. A pair of conduits 14 and 16 communicate the fluid pressure to a pair of brakes 18 and 20. The master cylinder 12 has a housing 22 with an opening 24 for a first bore 25 that receives a pair of pistons 26 and 28 which cooperate with the housing to form a pair of pressure chambers 30 and 32. The master cylinder 12 is of the type and operated in a manner similar to the master cylinder disclosed in U.S. Pat. No. 4,474,005; however, for the sake of clarity only those components that effect the operation of the switch 70 of this invention will be described in detail in the present application. Pressure chamber 30 is connected to output conduit 14 and internally by passage 34 to a stepped second bore 42 while pressure chamber 32 is connected to output conduit 16 and internally by passage 36 to the stepped second bore 42. The second bore 42 is perpendicular to bore 25 and is closed by an end plug 48, see FIG. 2. A differential area piston 52 is movably disposed in stepped bore 42 to separate a pair of cavities 54 and 56. Piston 52 has a groove 50 and ramps 58 and 60 which lead to lands 62 and 64. Housing 22 has an opening 63 which retains and guides an actuation pin 66, one end of which is normally located in groove 50 and one end extends through the housing 22 into engagement with switch 70 retained in slot 72 in reservoir assembly 40.

The reservoir assembly 40 communicates fluid through compensation port 29 to pressure chamber 30 and through compensation port 31 to chamber 32 when the pair of pistons 26 and 28 are in a rest position as shown in FIG. 1. The reservoir assembly 40 has flanges, not shown that fit over lips on housing 22. Bail wire 44 passes through openings in the flanges and engages the lips to fasten the reservoir assembly 40 to housing 22.

The reservoir assembly 40 has several compartments 39, 39'. . . $39^n$ which are interconnected. Fluid is free to pass from one compartment to the other as long as the fluid level is above openings 41 an 43. A float 76 which carries a magnet 78 located in compartment 39' and aligned over actuation pin 66 that extends from housing 22. Float 76 moves is a direct relationship to the fluid level in compartment 39'.

Figure 2:
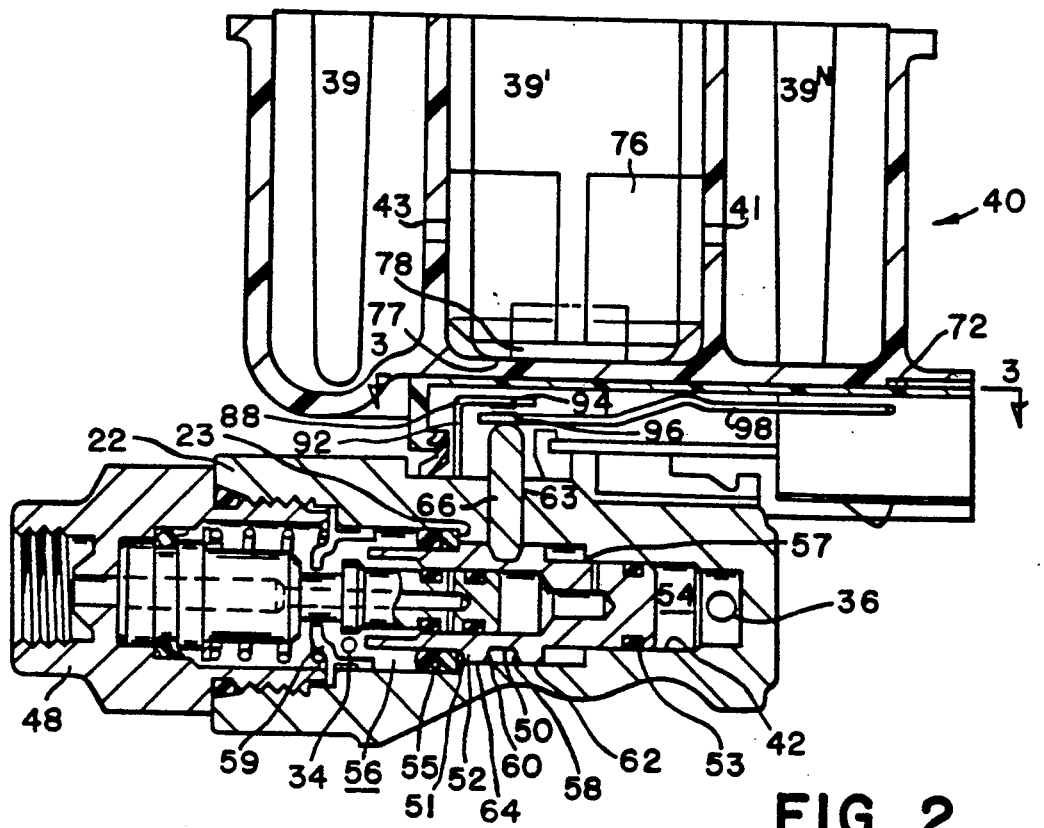
FIG. 2 is a cross section taken along line 2—2 of FIG. 1.
Figure 3:
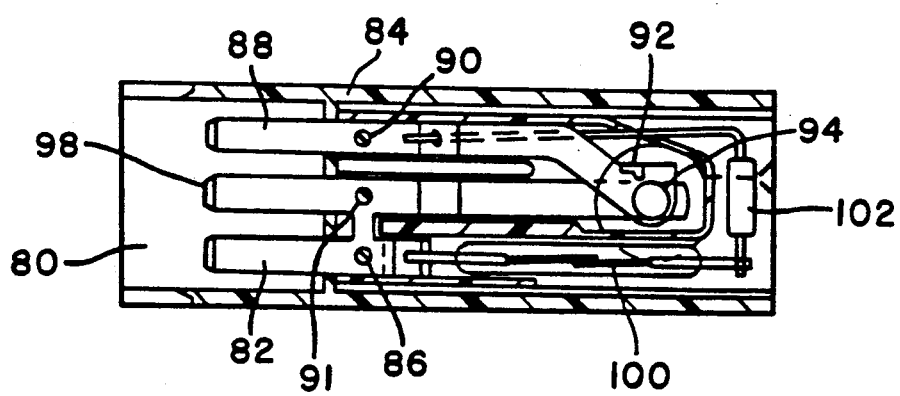
FIG. 3 is a cross section taken along line 3—3 of FIG. 2.

The switch 70 as best shown in FIGS. 2 and 3 has a housing 80 with a first blade 82 attached to a base 84 by pins 86 and 91 and a second blade 88 attached to the base 84 by a pin 90. A projection 92 extends from blade 88 and engages housing 22 to define a set distance between a second contact 94 on blade 88 and a first contact 96 on center extension 98 of the first blade 82. The second contact 96 engages the actuation pin 66 and resiliently biases actuation pin 66 into groove 50 in the differential area piston 52. A reed assembly 100 is connected by a first lead to the first blade 82 and by a second lead to the second blade 88 through resistor 102.

Figures 4, 5:
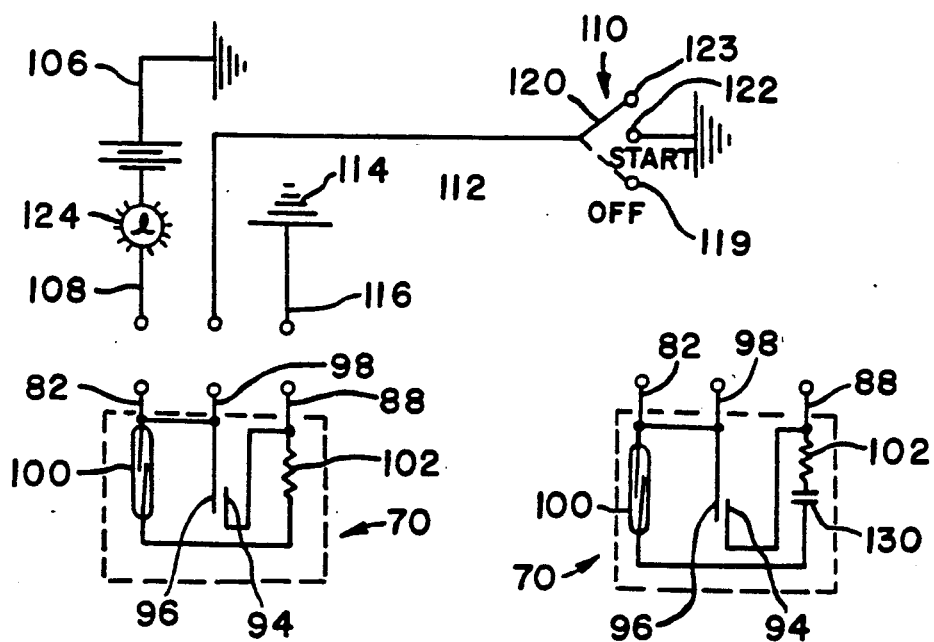
FIG. 4 is an electrical circuit which includes the switch of this invention.
FIG. 5 is a modification for the electrical circuit of FIG. 4.

The switch 70 is connected to a source of electrical current 106, see FIG. 4, by a first lead 108 connected to the first blade 82, the ignition switch 110 by lead 112 connected to extension 98, and to an electrical ground 114 by lead 116 connected to second blade 88. Each time the ignition switch 110 is moved from off position 119 to start position 122 a continuity check is made as blade 120 on switch 110 engages a contact to complete an electrical circuit between current source 106, indicator light 124, lead 108, blade 82, extension 98 and lead 112. Should switch 70 be inoperative or not connected to leads 108, 112, or 116, indicator light 124 will not operate during the start position of the ignition switch. 110 operation.

As long as the fluid level in compartments 39, 39'. . . $39^n$ of reservoir is above a preset level as determined by openings 41 and 43, magnet 78 has no effect on reed assembly 100, and as long as the fluid pressure developed in chambers 30 and 32 is substantially identical, the differential area piston 52 remains stationary and the gap between contacts 94 and 96 is maintained, indicator light 124 remains in an off state when blade 120 of ignition switch 110 moves to a run position 123.

During a brake application brake pedal 10 is pivoted about pin 11 to impart movement to the pistons 26 and 28, thereby generating fluid pressure in the pressure chambers 30 and 32, the brake circuits 14 and 16, and the cavities 54 and 56. If each brake circuit 14 and 16 and each brake assembly 18 and 20 are sealed properly against fluid leakage, the pressure developed in the cavities 54 and 56 is substantially identical. With the area of the differential area piston at seal 55 slightly less than the area of the stepped bore at seal 53 the fluid pressure in chamber 56 acts on seal 55 which engages shoulder 51 on piston 52 to overcome the force of the fluid pressure acting on the larger differential area 53 and moves piston 52 until shoulder 23 is engaged, the differential area piston 52 remains in its illustrated position in FIG. 1. In the alternative, if either brake circuit develops a leak so that fluid pressure is not maintained in that circuit, the other circuit operates during braking to bias the differential area piston 52 away from the illustrated position into abutment with stop 57 or 59 such that non electrical conductive actuation pin 66 moves out of groove 50 and up ramp 58 or 60 and onto land 62 or 64. As pin 66 moves up the ramp, contact 96 is brought into engagement with contact 94 to close an electrical circuit with indicator light 124 through blade 82, extension 98, blade 88 and lead 116. The resiliency of blades 82 and 98 which canteliver from contact pins 86 and 91, respectively, and provide a constant force on piston 52 in order that a minimum fluid pressure differential force is required before the piston 52 is moved toward either chamber 54 or 56 is such that differential area piston 52 moves in the second bore 42 without binding. Once indicator light 124 is activated, the operator is aware of a failure mode in a brake circuit. The indicator light 124 remains on until the fluid pressure differential recenters the piston 52.

When the fluid level in compartment 39' falls below a predetermined setting, the float 76 positions the magnet 78 against base 77. The lines of magnetic flux of the magnet 78 moves leaves in reed assembly 100 to complete an electrical circuit to ground 114 from current source 106 through indicator light 124 by way of lead 108, blade 82, resistor 102, blade 88 and lead 116. Magnet 78 maintains the leaves of reed assembly 100 closed until fluid is added to move float 76 away from base 77.

In order to distinguish the failure from the actuation of the indicator light 124, as shown in FIG. 5, a capacitor 130 is included in the reed assembly 100 circuit. After a period of time the capacitor 130 will build up an electrical charge and break down causing a temporary interruption in the flow of electrical current from source 106 to indicator light 124. Thus, a blinking signal observed by the operator provides a positive indication that the failure signal results from a low level fluid in the reservoir.

We claim:

1. A master cylinder comprising a first housing having a first bore for retaining a pair of pistons which are moved to develop fluid pressure in a pair of pressure chambers to effect a brake application, a second bore for receiving a differential area piston and first and second passages for connecting said pair of pressure chambers with said second bore, said differential area piston responding to said fluid pressure developed during a brake application to actuate a signal circuit in response to a failure mode in either pressure chamber, a reservoir attached to said first housing and containing fluid which is in communication with the pair of pressure chambers when the pistons are in a rest position, a float located in the reservoir and having a magnet for actuating a switch in the signal circuit when the fluid level in the reservoir is below a predetermined level, characterized in that said switch has a second housing and which is located between said first housing and reservoir, said second housing being aligned with said reservoir and first housing through a slot in said reservoir, said switch having a first pin for attaching a first blade to said second housing, said first blade having an end which cantilevers from said first pin with a first contact thereon, said switch having a second pin for attaching a second blade to said second housing, said second blade having an end which cantilevers from said second pin with a second contact thereon, said second blade resiliently urging a projection thereon into engagement with said first housing to position said second contact at substantially a fixed distance from said first housing, said first blade being connected through a reed switch to a second blade, said alignment of said second housing allowing said reed switch to respond to said magnet by closing said signal circuit to inform an operator of the predetermined fluid level in said reservoir, said switch having an actuation pin that extends though said first housing into engagement with a groove in said differential area piston, said first blade resiliently engaging said actuation pin to urge said actuation pin into said groove to define a gap between said first and second contacts, said gap being a function of the length of said actuation pin, said differential area piston in responding to said failure mode moving to correspondingly move said actuation pin out of said groove and up a ramp to a land to bring said first contact into engagement with said second contact to closed said signal circuit and inform an operator of the failure mode in one of the pressure chambers.

2. The master cylinder as recited in claim 1 in which said second blade of said switch is further characterized by having first and second leads one of which is connected to an ignition switch and the other is connected to an indicator light, said ignition switch having a test position whereby electrical current flows from a source through said first and second leads to operate said indicator light and provide an indication of a connection between said first and second blades, the source of electrical current and an electrical ground.

3. The master cylinder as recited in claim 2 wherein said switch is further characterized by a resistor located in second housing between said first blade and said reed switch to provide a distinct signal for operating said indicator light when a low fluid level occurs in the reservoir.

4. The master cylinder as recited in claim 3 wherein said switch is further characterized by a capacitor connected to said reed switch, said capacitor periodically interrupting a source of current to provide said indicator light with said distinct signal.

5. The master cylinder as recited in claim 4 wherein said first and second leads are connected together in said first blade to provide for the test of the indicator light.

6. The master cylinder as recited in claim 5 wherein said slot for aligning said switch with the reservoir and first housing is substantially parallel to said differential area piston, said reservoir and first housing protecting said switch from outside elements that could interrupt communication through said signal circuit.

* * * * *